(12) United States Patent
Maron et al.

(10) Patent No.: US 7,640,400 B2
(45) Date of Patent: Dec. 29, 2009

(54) PROGRAMMABLE DATA PREFETCHING

(75) Inventors: William A. Maron, Austin, TX (US);
Greg R. Mewhinney, Austin, TX (US);
Mysore S. Srinivas, Austin, TX (US);
David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/733,352

(22) Filed: Apr. 10, 2007

(65) Prior Publication Data

US 2008/0256302 A1  Oct. 16, 2008

(51) Int. Cl.
*G06F 12/00* (2006.01)
(52) U.S. Cl. .................. 711/137; 711/204; 711/213
(58) Field of Classification Search .......... 711/118, 711/137
See application file for complete search history.

(56) References Cited

U.S. PATENT DOCUMENTS

| | | | |
|---|---|---|---|
| 5,537,573 A * | 7/1996 | Ware et al. ............ | 711/137 |
| 5,822,576 A * | 10/1998 | Dinkjian et al. ........ | 712/239 |
| 6,560,693 B1 * | 5/2003 | Puzak et al. ........... | 712/207 |
| 6,662,274 B2 * | 12/2003 | Subramoney et al. .... | 711/137 |
| 6,728,726 B1 * | 4/2004 | Bernstein et al. ...... | 707/103 R |
| 6,751,709 B2 * | 6/2004 | Seidl et al. ............ | 711/137 |
| 7,124,253 B1 * | 10/2006 | Wright ................. | 711/141 |
| 2003/0217231 A1 * | 11/2003 | Seidl et al. ............ | 711/137 |
| 2004/0059873 A1 | 3/2004 | Hum et al. | |

OTHER PUBLICATIONS

Kaeli et al., "Tying Data Prefetching to Branch Prediction", IBM Technical Disclosure Bulletin, v.36, n. 10, Oct. 1993, pp. 69-70.*

* cited by examiner

*Primary Examiner*—Kevin Verbrugge
(74) *Attorney, Agent, or Firm*—Francis Lammes; Stephen J. Walder, Jr.; Diana R. Gerhardt

(57) ABSTRACT

A method, computer program product, and system are provided for prefetching data into a cache memory. As a program is executed an object identifier is obtained of a first object of the program. A lookup operation is performed on a data structure to determine if the object identifier is present in the data structure. Responsive to the object identifier being present in the data structure, a referenced object identifier is retrieved that is referenced by the object identifier. Then, the data associated with the referenced object identifier is prefetched from main memory into the cache memory.

20 Claims, 5 Drawing Sheets

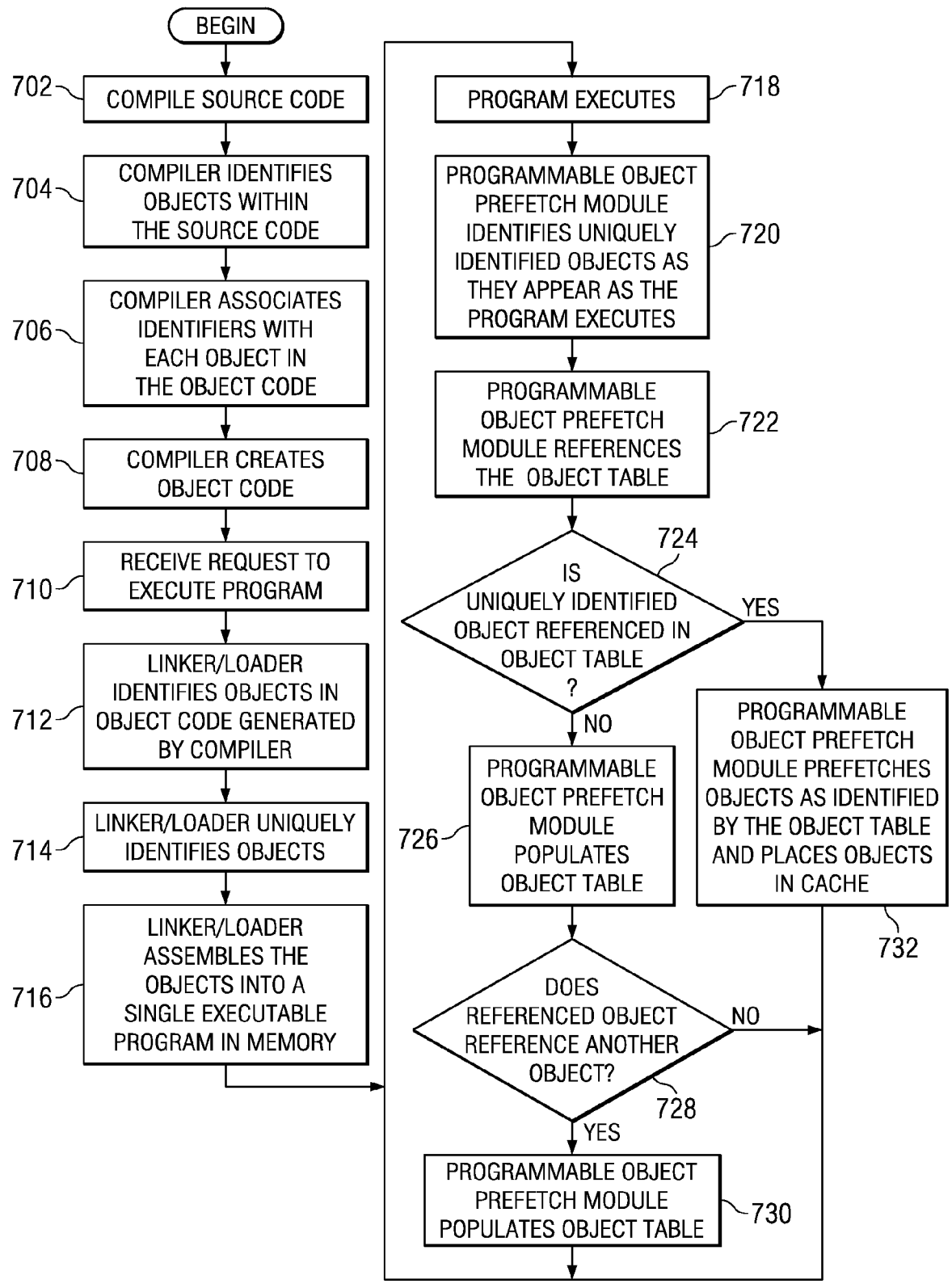

PROGRAMMABLE DATA PREFETCHING

BACKGROUND

1. Technical Field

The present application relates generally to data prefetching. More particularly, the present application relates to a method, system, and computer program product for prefetching data using programmable object identification.

2. Description of the Related Art

A central processing unit (CPU) cache is a cache used by the CPU of a computer to reduce the average time to access memory. The cache is a smaller, faster memory which stores copies of the data from the most frequently used main memory locations. As long as most memory accesses are to cached memory locations, the average latency of memory accesses will be closer to the cache latency than to the latency of main memory.

When a processor wishes to read or write a location in main memory, the processor first checks whether that memory location is in the cache. This is accomplished by comparing the address of the memory location to all tags in the cache that might contain that address. When the processor finds that the memory location is in the cache it is referred to as a cache hit. When the processor cannot find that the memory location is in the cache it is referred to as a cache miss. In the case of a cache hit, the processor immediately reads or writes the data in the cache line. The proportion of accesses that result in a cache hit is known as the hit rate, and is a measure of the effectiveness of the cache.

In the case of a cache miss, most caches allocate a new entry, which comprises the tag just missed and a copy of the data from memory. The reference can then be applied to the new entry just as in the case of a cache hit. Misses are comparatively slow because they require the data to be transferred from main memory. This transfer incurs a delay since main memory is much slower than cache memory, and also incurs the overhead for recording the new data in the cache before it is delivered to the processor.

Once a cache is full, data must be removed from the cache in order to make room for newer data. The most common method for choosing which data to remove from the cache is to track when a particular block of data was last used and remove the least recently used block from the cache. Therefore, if data has not been used recently, it is unlikely to be in the cache, and will have to be loaded from main memory before it can be accessed by the CPU. This can lead to loss of performance while the CPU waits for the data to be retrieved from memory.

One solution to this problem is to anticipate what data will be needed in the near future and prefetch that data into cache. There are two commonly used methods to determine which data to prefetch:

sequential read, and
touch instructions.

In using a sequential read, data is read either immediately before or after the last data accessed. Sequential reading is effective at prefetching data with good spatial locality, but is of no use when accessing data at random locations.

For each execution of a touch instruction, a random number in the range [0, size-1] is added to the address operand of the touch instruction to generate a virtual address. The page portion of the address makes up the next element in the page-reference string for the process. When a touch instruction generates a page reference for an invalid page, the interpreter must allocate a frame to the process. Furthermore, touch instructions are generally advisory. Instructions that are advisory are instructions that are optional, which means that the advisory instructions may not be executed if the central processing unit is busy. Therefore, touch instructions may not work if the hardware is busy. Additionally, with touch instructions when an Object A refers to an Object B, which then Object B refers to an Object C, each of these objects are usually in different layers of the software stack. As a result, instructions in a layer of a software stack working on Object A, would not be aware of Object C and any other objects hierarchically below Object C because Object C is not immediately below Object A, as Object C is immediately below Object B. Such a circumstance implies that a given layer of software stack can at most prefetch objects that are immediately below it in the hierarchy through touch instructions. That is, only Object B may be prefetched by Object A, since Object B is the only object immediately below Object A.

SUMMARY

The illustrative embodiments provide for an intelligent method to identify objects that will be accessed, based on known hierarchical relationship between the objects, so that the data can be prefetched into cache. As a program is executed an object identifier is obtained of a first object of the program. A lookup operation is performed on a data structure to determine if the object identifier is present in the data structure. A referenced object identifier that is referenced by the object identifier is retrieved in response to the object identifier being present in the data structure. The data associated with the referenced object identifier is retrieved from main memory into the cache memory.

The illustrative embodiments also provide for determining if the first object references a second object in response to the object identifier failing to appear in the data structure. The data structure is populated to include first object information in response to the first object referencing the second object. The illustrative embodiments also determine if the second object references a third object. The data structure is populated to include second object information in response to the second object referencing the third object.

In the illustrative embodiments the object information may include at least one of the object identifier, an offset, or the referenced object identifier, where the offset identifies a location within the first object where an address of the second object is referenced. The first object may be one of a plurality of objects and each of the plurality of objects may be uniquely identified. A linker/loader program uniquely identifies each of the plurality of objects. The linker/loader program uniquely identifies each of the plurality of objects by adding an additional identifier to each of the plurality of objects.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts a flowchart of the operation of prefetching data in accordance with an illustrative embodiment.

DETAILED DESCRIPTION OF THE PREFERRED EMBODIMENT

Figure 1:
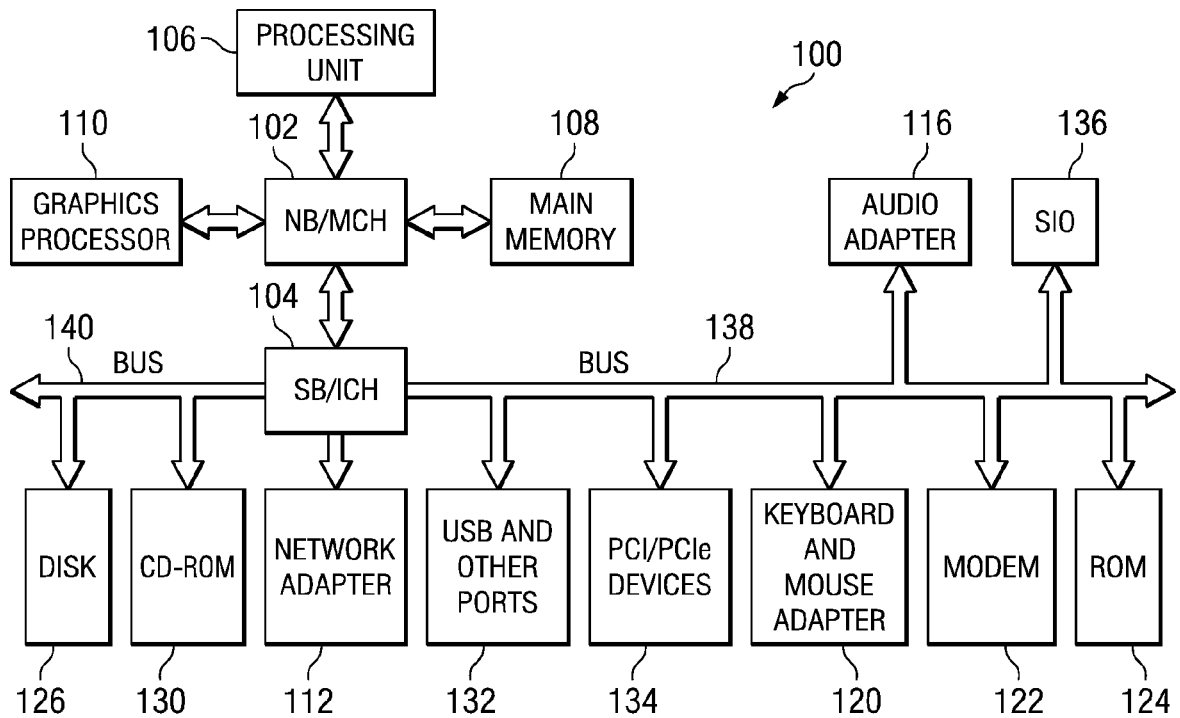
FIG. 1 depicts a block diagram of a data processing system in which the illustrative embodiments may be implemented.

The illustrative embodiments provide mechanisms for prefetching data using programmable object identification. FIG. 1 is provided as an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Figure 2:
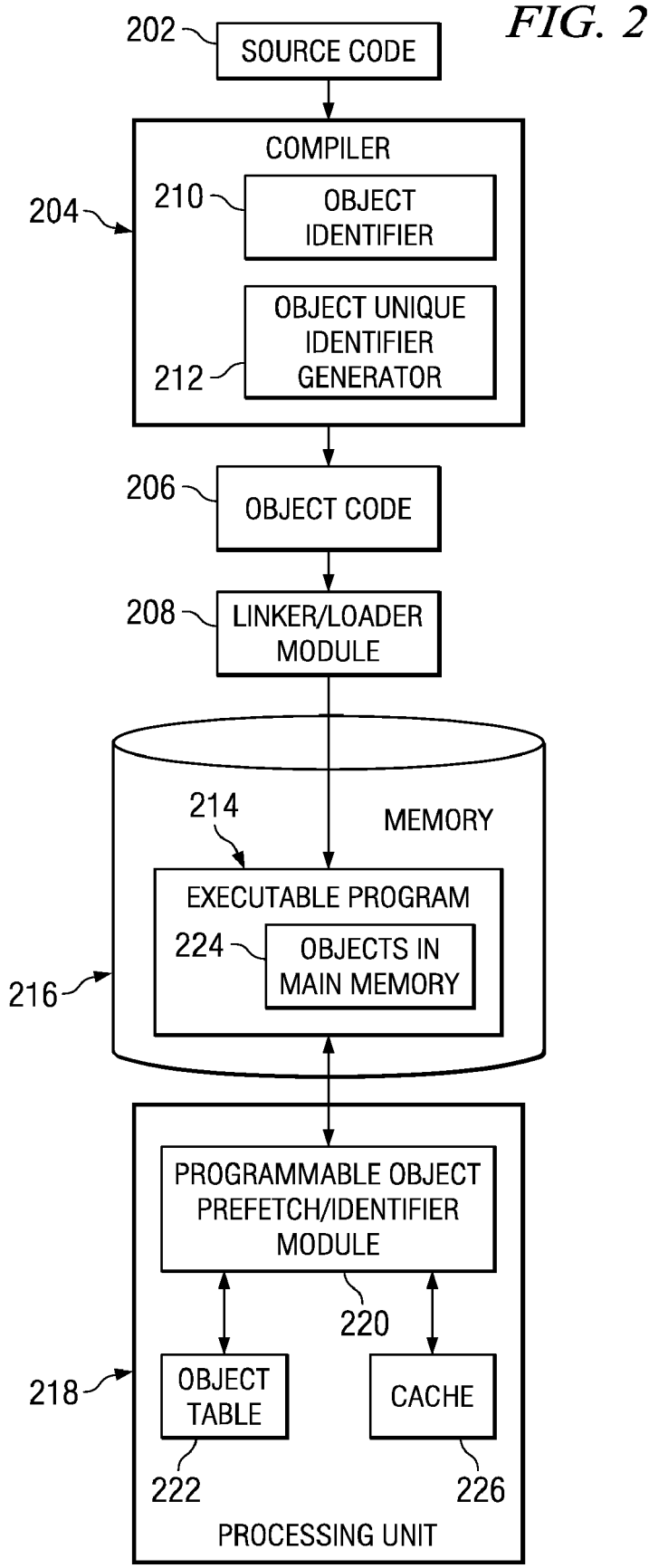
FIG. 2 depicts an exemplary block diagram of components used to prefetch data using programmable object identification in accordance with an illustrative embodiment.

FIG. 2 depicts an exemplary block diagram of components used to prefetch data using programmable object identification in accordance with an illustrative embodiment. The illustrative embodiments use the term object instead of data, as an object is an individual unit of run-time data storage that is used as the basic building block of programs. In order to prefetch objects using programmable object identification, compiler 204 must first compile source code 202. Source code 202 may be a program or application executed by a data processing system, such as data processing system 100 of FIG. 1. Compiler 204 is a computer program, or set of programs, that translates text of source code 202 written in a source computer language into a target computer language or object code 206. Object code 206 most commonly has a form suitable for processing by other programs, such as linker/loader module 208, but object code 206 may also be a human-readable text file. During compiling of source code 202, compiler 204 uses object identifier 210 to identify objects within source code 202. Then, object unique identifier generator 212 assigns a unique identifier to each object that is identified by object identifier 210. The uniquely identified objects are then included in object code 206.

When a user requests that the program be executed, linker/loader module 208 identifies the uniquely identified objects generated by compiler 204 in object code 206. Linker/loader module 208 may further uniquely identify the uniquely identified objects by adding an additional identifier to each uniquely identified object so that objects of one program may be differentiated from objects of another program. Further differentiating objects with program specific unique identifiers may increase cache performance by allowing objects to be easily identified as will be described below. Then, linker/loader module 208 takes object code 206 generated by compiler 204 and assembles the object code 206 into executable program 214. Memory 216, such as main memory 108 in FIG. 1, stores executable program 214 produced by linker/loader module 208.

Executable program 214 is a stack of several layers of component code, each component accomplishing a set of tasks by working on objects owned by the given component. A component is a piece of the program that is to be installed, for example, single files, a group of related files, objects, registration, registry keys, shortcuts, resources, libraries grouped into a directory, shared pieces of code, or the like. A simple example is an I/O stack comprised of several layers of drivers, such as an adapter driver sitting below a protocol driver, which in turn the protocol driver sits below an array driver, the array driver may sit below a logical volume driver, and so on.

Processing unit 218 then executes executable program 214. As processing unit 218 executes executable program 214, programmable object prefetch/identifier module 220 identifies the uniquely identified objects as they appear in executable program 214. Then, programmable object prefetch/identifier module 220 references object table 222 to determine if the uniquely identified object that references another object is referenced in object table 222. Object table 222 is a two-dimensional data structure of uniquely identified objects that reference other uniquely identified objects. Programmable object prefetch/identifier module 220 populates object table 222 as uniquely identified objects are encountered during execution of the program. If the uniquely identified object that references another object is not referenced in object table 222, programmable object prefetch/identifier module 220 populates object table 222 with the object identifier of the uniquely identified object, all objects referenced by the uniquely identified object, and each offset in the uniquely identified object's address where the address of the referenced objects are located.

Then, programmable object prefetch/identifier module 220 determines if the referenced objects reference other objects. If the referenced objects reference other objects, then programmable object prefetch/identifier module 220 populates object table 222 with the object identifier of the referenced object, all objects referenced by the referenced object, and each offset in the referenced object's address where the address of the other referenced objects are located. If the referenced objects in executable program 214 fails to reference other objects, no information is populated in object table 222 because object table 222 only contains object information for objects that reference other objects in order to improve performance of the system by prefetching objects referenced by other objects.

If the uniquely identified object that references another object is present in object table 222, then programmable object prefetch/identifier module 220 uses the identified offset in object table 222 to obtain the address from the uniquely identified object in order to prefetch the referenced objects in main memory 224. Programmable object prefetch/identifier module 220 then places the prefetched object into cache 226. Programmable object prefetch/identifier module 220 identifies the address within the uniquely identified object of each referenced object using the offset identified in object table 222 and prefetches each referenced object into cache 226.

Figure 3:
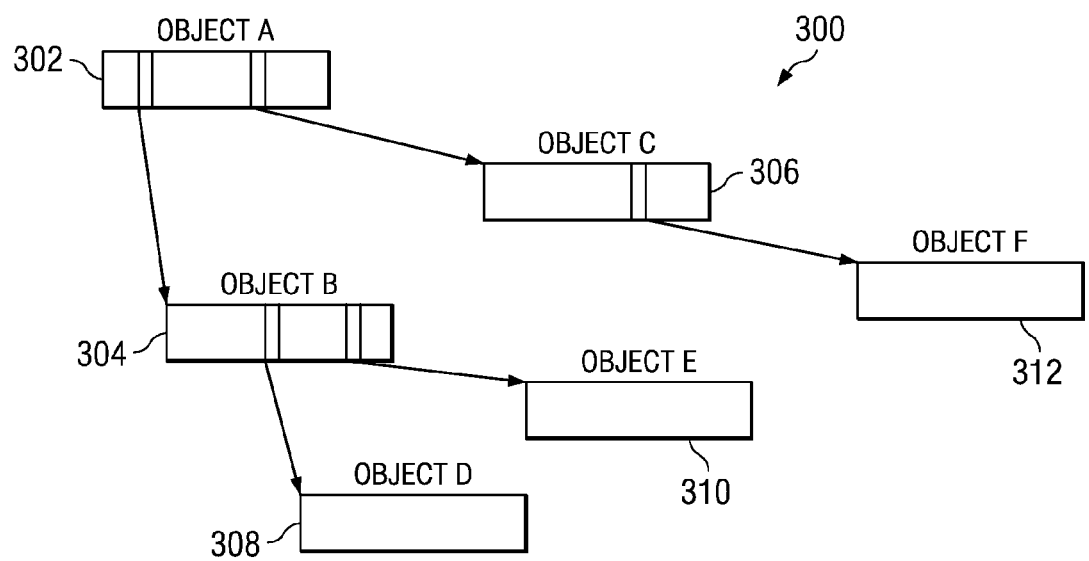
FIG. 3 depicts an exemplary object relationship in accordance with an illustrative embodiment.

FIG. 3 depicts an exemplary object relationship in accordance with an illustrative embodiment. Object relationship 300 is for objects that may exist within an executable program, such as executable program 214 of FIG. 2. In object relationship 300, Object A 302 references two other objects, Object B 304 and Object C 306. As can be seen in the diagram, Object B 304 further references Object D 308 and Object E 310. Additionally, Object C 306 references Object F 312.

During execution of the executable program, when programmable object prefetch/identifier module encounters Object A 302, then Object B 304 and Object C 306 are prefetched into cache using the offsets within Object A 302. Upon prefetching Object B 304 and Object C 306, Object D 308, Object E 310, and Object F 312 are also prefetched into the cache using the offsets within Object B 304 and Object C 306.

Figure 4:
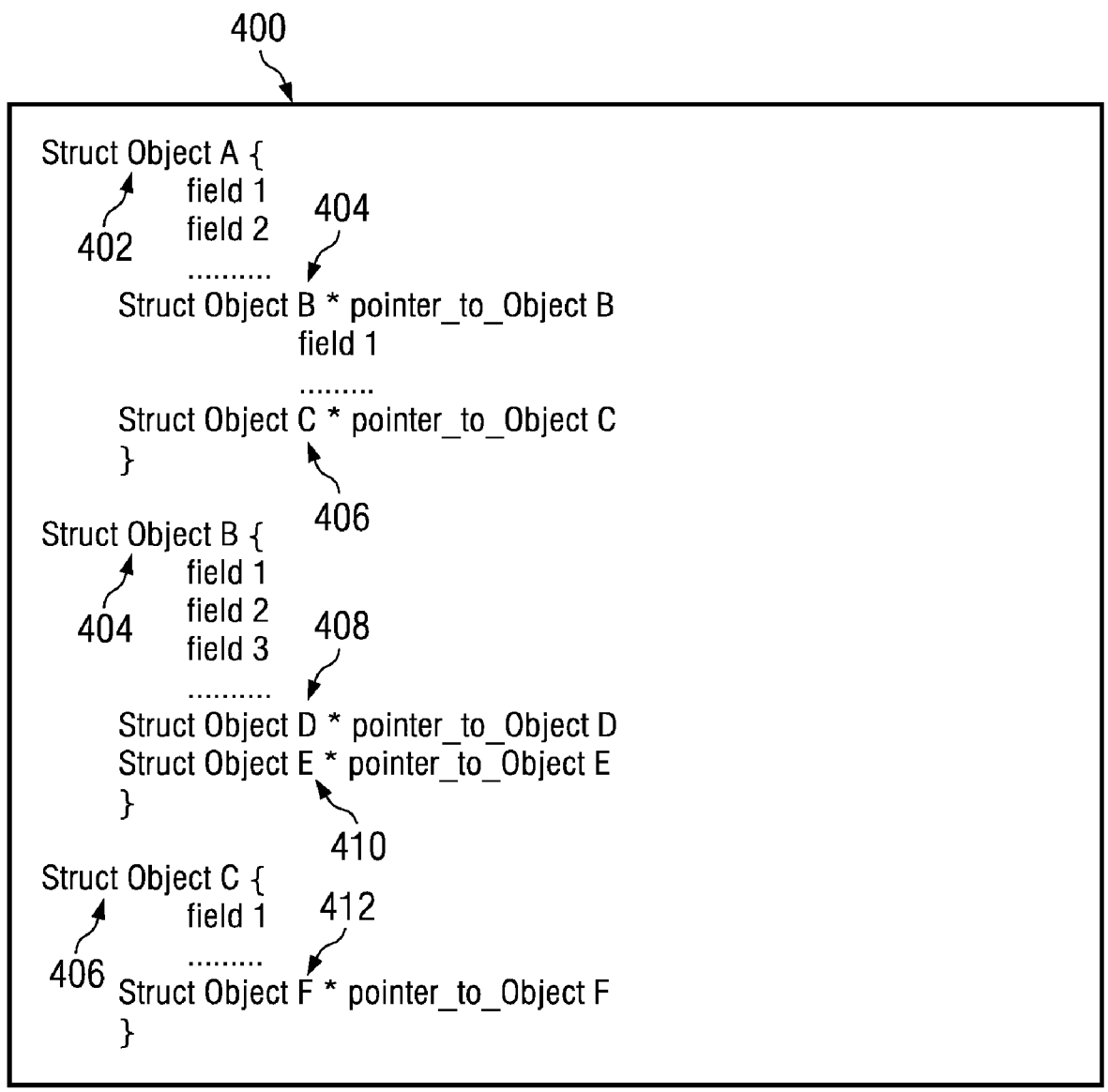
FIG. 4 depicts a portion of exemplary executable program code where objects are referenced in accordance with an illustrative embodiment.

FIG. 4 depicts a portion of exemplary executable program code where objects are referenced in accordance with an illustrative embodiment. Executable program code portion 400 may be code, such as executable program 214 of FIG. 2. Executable program code portion 400 is the program code that represents object relationship 300 of FIG. 3. In executable program code portion 400, Object A 402 references two other objects, Object B 404 and Object C 406. As can be seen in the diagram, Object B 404 further references Object D 408 and Object E 410. Additionally, Object C 406 references Object F 412.

By capturing the object relationship, other objects in the hierarchy of executable program code portion 400 may be effectively prefetched. The key point is that the objects being prefetched have no spatial locality, and the object relationship is built in a table. As discussed above, for each object type a two-dimensional object table is maintained. The object table holds information, such as the object identifier of the uniquely identified object, all objects referenced by the uniquely identified object, and each offset in the uniquely identified object's address where the address of the referenced objects are located.

Figure 5:
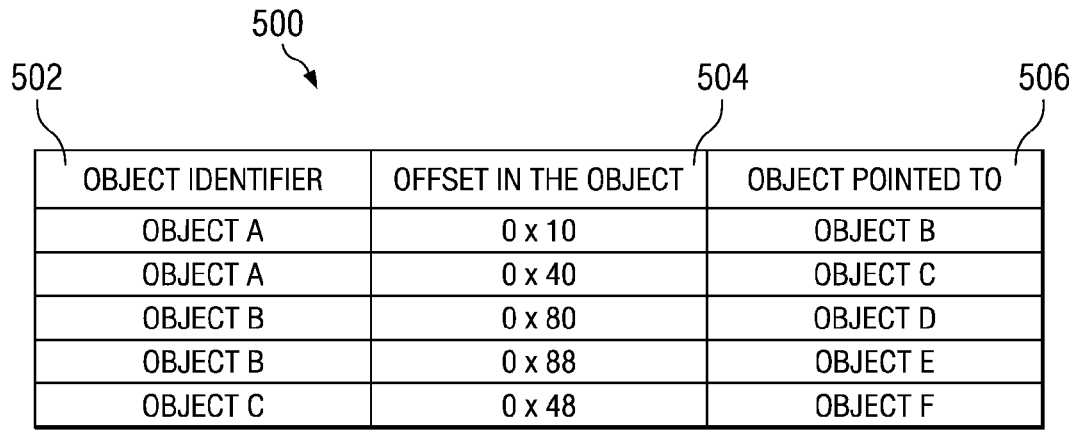
FIG. 5 depicts an exemplary logical representation of an object table in accordance with an illustrative embodiment.

FIG. 5 depicts an exemplary logical representation of an object table in accordance with an illustrative embodiment. Object table 500 includes object identifier 502, offset in the object 504, and object pointed to 506. Object identifier 502 is the identifier or name of the uniquely identified object that references another object. Offset in the object 504 is the address within the uniquely identified object where the other object is referenced. Object pointed to 506 is the identifier of the object referenced by the uniquely identified object. Object table 500 may be maintained by hardware in a, for example, least recently used (LRU) fashion, Least Frequently Used (LFU), or the like. A LRU algorithm discards the least recently used items first. The LRU algorithm requires keeping track of what was used when. A LFU algorithm counts how often an item is needed and those items that are used least often are discarded first. Therefore, most object references in object table 500 would be to object types that are frequently referenced or used.

Figure 6:
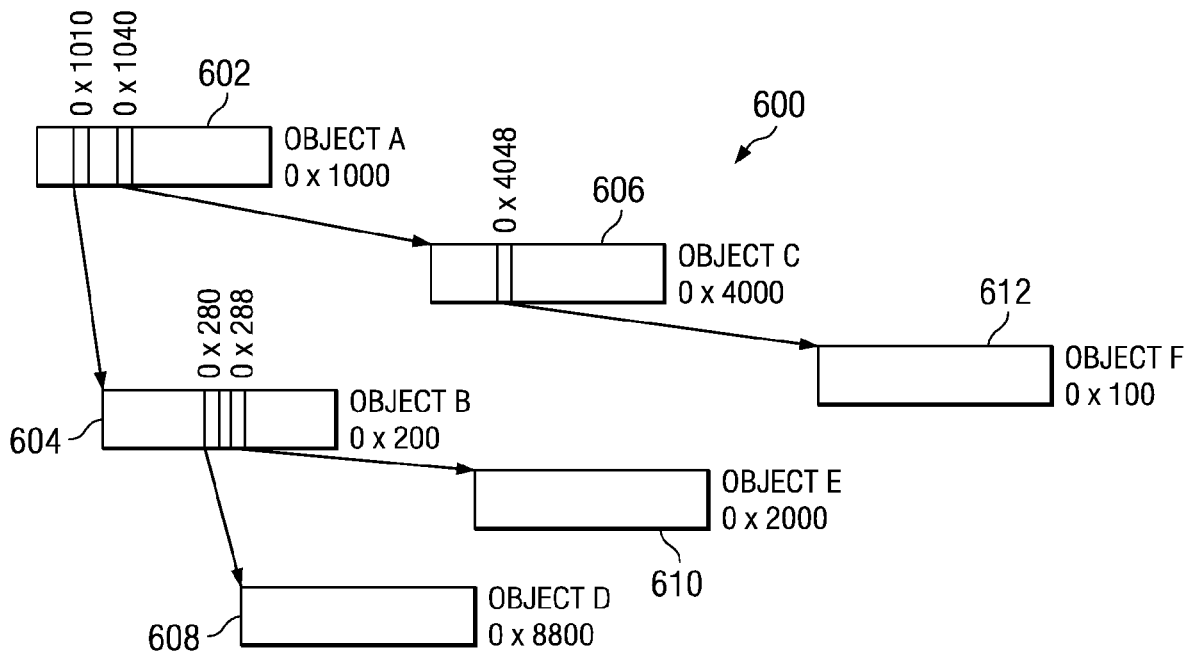
FIG. 6 depicts an exemplary object addressing scheme in accordance with an illustrative embodiment.

FIG. 6 depicts an exemplary object addressing scheme in accordance with an illustrative embodiment. In object addressing scheme 600, Object A 602 has a virtual address (VA) of 0x1000. Using the object table, such as object table 500 of FIG. 5, a programmable object prefetch/identifier module when encountering Object A 602 would realize that (VA+0x10) points to Object B's 604 virtual address (VB) of 0x200 and would also realize that (VA+0x40) points to Object C's 606 virtual address (VC) of 0x4000. When the programmable object prefetch/identifier module then encounters Object B 604, the programmable object prefetch/identifier module would realize that (VB+0x80) points to Object D's 608 virtual address (VD) of 0x8800 and would also realize that (VB+0x88) points to Object E's 610 virtual address (VE) of 0x2000. Accordingly, when the programmable object prefetch/identifier module then encounters Object C 606, the programmable object prefetch/identifier module would realize that (VC+0x48) points to Object F's 612 virtual address (VF) of 0x100. This identification of objects by a programmable object prefetch/identifier module, such as programmable object prefetch/identifier module 220 of FIG. 2, effectively fetches objects in real time across the entire layer of the software stack.

FIG. 7 depicts a flowchart of the operation of prefetching data in accordance with an illustrative embodiment. As stated above, the illustrative embodiments use the term object instead of data as an object is an individual unit of run-time data storage that is used as the basic building block of programs. As the operation begins, a compiler, such as compiler 204 of FIG. 2, compiles source code (step 702). During compiling of the source code, the compiler uses an object identifier to identify objects within the source code (step 704). Then, the compiler uses an object unique identifier generator to assign unique identifiers to each object that is identified by the object identifier (step 706). The compiler then creates object code that includes the uniquely identified objects (step 708).

Upon the processing unit, such as processing unit 218 of FIG. 2, receiving a request to execute the program (step 710), a linker/loader module, such as linker/loader module 208 of FIG. 2, identifies the uniquely identified objects in the object code generated by the compiler (step 712). Then, the linker/loader module further uniquely identifies the uniquely identified objects by adding an additional identifier to the uniquely identified object (step 714). The linker/loader module then assembles the object code and objects into a single executable program which is stored in memory (step 716).

The processing unit then executes the executable program (step 718). As the processing unit executes the executable program, a programmable object prefetch/identifier module, such as programmable object prefetch/identifier module 220 of FIG. 2, identifies the uniquely identified objects as they appear in the executing program (step 720). Then, the programmable object prefetch/identifier module references an object table, such as object table 222 of FIG. 2 (step 722). The programmable object prefetch/identifier module determines if the uniquely identified object that references another object is referenced in the object table (step 724).

If at step 724 the uniquely identified object that references another object is not referenced in the object table, then the programmable object prefetch/identifier module populates the object table with the object identifier of the uniquely identified object, all objects referenced by the uniquely identified object, and each offset in the uniquely identified object's address where the address of the referenced objects are located (step 726). Then the programmable object prefetch/identifier module determines if the referenced objects reference other objects (step 728). If at step 728 the referenced objects reference other objects, then the programmable object prefetch/identifier module populates the object table with the object identifier of the referenced object, all objects referenced by the referenced object, and each offset in the referenced object's address where the address of the other referenced objects are located (step 730) with the operation returning to step 718 thereafter. If at step 728 the referenced objects in the object table fail to reference other objects, then the operation returns to step 718.

Returning to step 724, if the uniquely identified object that references another object is present in the object table, then the programmable object prefetch/identifier module uses the identified offset in the object table 222 to obtain the address from the uniquely identified object in order to prefetch the referenced object from objects in the main memory and place the prefetched object into a cache (step 732), with the operation returning to step 718.

Thus, the illustrative embodiments prefetch data using programmable object identification. As a program is executed an object identifier is obtained of a first object of the program. A lookup operation is performed on a data structure to determine if the object identifier is present in the data structure. A referenced object identifier that is referenced by the object identifier is retrieved in response to the object identifier being present in the data structure. The data associated with the referenced object identifier is retrieved from main memory into the cache memory.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for prefetching data into a cache memory, the method comprising:

executing, by the data processing system, a program;

obtaining, by the data processing system as the program executes, an object identifier of a first object in a plurality of objects of the program;

performing, by the data processing system, a first lookup operation on a data structure to determine if the object identifier is present in the data structure, wherein the data structure is a two-dimensional object table of uniquely identified objects that reference other uniquely identified objects;

responsive to the object identifier being present in the data structure, retrieving, by the data processing system, at least one referenced object identifier of at least one referenced object that is referenced by the object identifier of the first object; and prefetching, by the data processing system, all data associated with the object identifier of the first object and the at least one referenced object identifier of at least one referenced object from main memory into the cache memory.

2. The method of claim 1, further comprising:

responsive to the object identifier failing to appear in the data structure, determining, by the data processing system, if the first object references a second object; and responsive to the first object referencing the second object, populating, by the data processing system, the data structure to include first object information and second object information.

3. The method of claim 2, further comprising:

determining, by the data processing system, if the second object references a third object; and responsive to the second object referencing the third object, populating, by the data processing system, the data structure to include third object information.

4. The method of claim 3, wherein the first object information includes at least one of the object identifier, an offset to the second object, and a second object identifier, wherein the second object information includes at least one of a second object identifier, an offset to the third object, and a third object identifier, and wherein the third object information includes an object identifier at least one of a third object identifier, an offset to at least one additional referenced object, or at least one additional referenced object identifier.

5. The method of claim 4, wherein the offset identifies a location within the first object where an address of the second object is referenced.

6. The method of claim 1, wherein a linker/loader program uniquely identifies each of the plurality of objects.

7. The method of claim 6, wherein the linker/loader program uniquely identifies each of the plurality of objects by adding an additional identifier to each of the plurality of objects.

8. A computer program product comprising a computer storage medium having a computer readable program stored thereon, wherein the computer readable program, when executed in a data processing system, causes the data processing system to:

execute a program;

obtain, as the program executes, an object identifier of a first object in a plurality of objects of the program;

perform a first lookup operation on a data structure to determine if the object identifier is present in the data structure, wherein the data structure is a two-dimensional object table of uniquely identified objects that reference other uniquely identified objects;

responsive to the object identifier being present in the data structure, retrieve at least one referenced object identifier of at least one referenced object that is referenced by the object identifier of the first object; and prefetch all data associated with the object identifier of the first object and the at least one referenced object identifier of at least one referenced object from main memory into a cache memory.

9. The computer program product of claim 8, wherein the computer readable program further causes the data processing system to:

responsive to the object identifier failing to appear in the data structure, determine if the first object references a second object; and responsive to the first object referencing the second object, populate the data structure to include first object information and second object information.

10. The computer program product of claim 9, wherein the computer readable program further causes the data processing system to:

determine if the second object references a third object; and responsive to the second object referencing the third object, populate the data structure to include third object information.

11. The computer program product of claim 10, wherein the first object information includes at least one of the object identifier, an offset to the second object, and a second object identifier, wherein the second object information includes at least one of a second object identifier, an offset to the third object, and a third object identifier, wherein the third object information includes an object identifier at least one of a third object identifier, an offset to at least one additional referenced object, or at least one additional referenced object identifier, and wherein the offset identifies a location within the first object where an address of the second object is referenced.

12. The computer program product of claim 8, wherein a linker/loader program uniquely identifies each of the plurality of objects and wherein the linker/loader program uniquely identifies each of the plurality of objects by adding an additional identifier to each of the plurality of objects.

13. A system, comprising:
a processor; and
a memory coupled to the processor, wherein the memory comprises instructions which, when executed by the processor, cause the processor to:
execute a program;
obtain, as the program executes, an object identifier of a first object in a plurality of objects of the program;
perform a first lookup operation on a data structure to determine if the object identifier is present in the data structure, wherein the data structure is a two-dimensional object table of uniquely identified objects that reference other uniquely identified objects;
responsive to the object identifier being present in the data structure, retrieve at least one referenced object identifier of at least one referenced object that is referenced by the object identifier of the first object; and
prefetch all data associated with the object identifier of the first object and the at least one referenced object identifier of at least one referenced object from main memory into a cache memory.

14. The system of claim 13, wherein the instructions further cause the processor to:
responsive to the object identifier failing to appear in the data structure, determine if the first object references a second object; and
responsive to the first object referencing the second object, populate the data structure to include first object information and second object information.

15. The system of claim 14, wherein the instructions further cause the processor to:
determine if the second object references a third object; and
responsive to the second object referencing the third object, populate the data structure to include third object information.

16. The system of claim 15, wherein the first object information includes at least one of the object identifier, an offset to the second object, and a second object identifier, wherein the second object information includes at least one of a second object identifier, an offset to the third object, and a third object identifier, wherein the third object information includes an object identifier at least one of a third object identifier, an offset to at least one additional referenced object, or at least one additional referenced object identifier, and wherein the offset identifies a location within the first object where an address of the second object is referenced.

17. The system of claim 13, wherein a linker/loader program uniquely identifies each of the plurality of objects and wherein the linker/loader program uniquely identifies each of the plurality of objects by adding an additional identifier to each of the plurality of objects.

18. The method of claim 1, further comprising:
performing a second lookup operation on the data structure to determine if the at least one referenced object identifier is present in the data structure;
responsive to the at least one referenced object identifier being present in the data structure, retrieving at least one additional referenced object identifier of at least one additional referenced object that is referenced by the at least one referenced object identifier of the at least one referenced object; and
prefetching all data associated with the at least one additional referenced object identifier of at least one additional referenced object from the main memory into the cache memory.

19. The computer program product of claim 8, wherein the computer readable program further causes the data processing system to:
perform a second lookup operation on the data structure to determine if the at least one referenced object identifier is present in the data structure;
responsive to the at least one referenced object identifier being present in the data structure, retrieve at least one additional referenced object identifier of at least one additional referenced object that is referenced by the at least one referenced object identifier of the at least one referenced object; and
prefetch all data associated with the at least one additional referenced object identifier of at least one additional referenced object from the main memory into the cache memory.

20. The system of claim 13, wherein the instructions further cause the processor to:
perform a second lookup operation on the data structure to determine if the at least one referenced object identifier is present in the data structure;
responsive to the at least one referenced object identifier being present in the data structure, retrieve at least one additional referenced object identifier of at least one additional referenced object that is referenced by the at least one referenced object identifier of the at least one referenced object; and
prefetch all data associated with the at least one additional referenced object identifier of at least one additional referenced object from the main memory into the cache memory.

* * * * *